(12) United States Patent
Areh et al.

(10) Patent No.: US 7,445,171 B2
(45) Date of Patent: Nov. 4, 2008

(54) MOTORIZED KITCHEN APPLIANCE

(75) Inventors: Marko Areh, Radlje Ob Dravi (SI);
Siegmund Kramer, Kirchanschöring (DE); Henrik Pavlovic, Ljubno Ob Savinji (SI); Michael Steffl, Marquartstein (DE); Igor Zibret, Smartno Ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 7 days.

(21) Appl. No.: 10/791,529

(22) Filed: Mar. 1, 2004

(65) Prior Publication Data

US 2005/0081724 A1 Apr. 21, 2005

Related U.S. Application Data

(63) Continuation of application No. PCT/EP02/09465, filed on Aug. 23, 2002.

(30) Foreign Application Priority Data

Aug. 30, 2001 (DE) .................................. 101 42 505

(51) Int. Cl.
*B02C 17/02* (2006.01)
*B27B 13/00* (2006.01)

(52) U.S. Cl. ...................... 241/92; 241/282.2; 99/503; 99/504

(58) Field of Classification Search ................ 241/168, 241/169, 169.1, 92, 282.1, 282.2, 69; 99/501–504, 99/506–508
See application file for complete search history.

(56) References Cited

U.S. PATENT DOCUMENTS

| | | | | |
|---|---|---|---|---|
| 2,138,716 A * | 11/1938 | Truitt | ...................... | 241/273.2 |
| 2,481,848 A * | 9/1949 | Lapps | ..................... | 99/511 |
| 2,533,811 A * | 12/1950 | Jepson | ..................... | 99/501 |
| 2,552,572 A * | 5/1951 | Mikina | ..................... | 99/503 |
| 3,262,474 A * | 7/1966 | Enders | ..................... | 408/209 |
| 3,753,297 A * | 8/1973 | Mantelet | ..................... | 34/58 |
| 3,916,776 A * | 11/1975 | Arao et al. | ..................... | 99/503 |
| 4,186,096 A * | 1/1980 | Areaux et al. | ............... | 210/377 |
| 4,345,517 A * | 8/1982 | Arao et al. | ..................... | 99/511 |
| 5,074,201 A * | 12/1991 | Takeyama et al. | ............. | 99/483 |
| 5,236,135 A * | 8/1993 | Wilson et al. | ................ | 241/21 |
| 5,289,760 A * | 3/1994 | Barradas | ..................... | 99/331 |
| 5,551,335 A * | 9/1996 | McClean | ..................... | 99/504 |
| 6,676,052 B2 * | 1/2004 | Wu | ..................... | 241/169.1 |
| 6,814,321 B2 * | 11/2004 | Schorn et al. | ................ | 241/36 |

FOREIGN PATENT DOCUMENTS

DE 1 928 183 12/1970
EP 0 362 058 B1 4/1990

* cited by examiner

*Primary Examiner*—Bena Miller
(74) *Attorney, Agent, or Firm*—Russell W. Warnock; James E. Howard

(57) ABSTRACT

A motorized kitchen appliance provides a resilient fixation of a drive unit, surrounded by an outer wall, within a housing of the kitchen appliance. The drive unit is resiliently mounted in the housing through the use of projections and is fixed therein in the manner of a bayonet fitting.

8 Claims, 2 Drawing Sheets

MOTORIZED KITCHEN APPLIANCE

CROSS-REFERENCE TO RELATED APPLICATION

This application is a continuation, under 35 U.S.C. § 120, of copending international application No. PCT/EP02/09465, filed Aug. 23, 2002, which designated the United States; this application also claims the priority, under 35 U.S.C. § 119, of German Patent Application 101 42 505.8, filed Aug. 30, 2001; the prior applications are herewith incorporated herein by reference in their entirety.

BACKGROUND OF THE INVENTION

FIELD OF THE INVENTION

The invention relates to a motorized kitchen appliance, especially a fruit press, including a drive unit and a housing.

A fruit press driven by an electric motor is known from European Patent 0 362 058 B1. An element in the form of a paraboloid of revolution projecting from a collecting container is used therein to press a citrus fruit. It is accommodated, together with a collecting dish used to collect the fruit juice which drops down during pressing, in a housing in which a drive unit with a drive motor, drive pulleys, a cogged belt and a drive shaft connected to the element, are disposed. A drive shaft projects through the collecting dish, which sets the projecting element, and the collecting container along with the element, in rotary motion. That device is relatively complicated.

SUMMARY OF THE INVENTION

It is accordingly an object of the invention to provide a motorized kitchen appliance, which overcomes the hereinafore-mentioned disadvantages of the heretofore-known devices of this general type and which is simply constructed.

With the foregoing and other objects in view there is provided, in accordance with the invention, a motorized kitchen appliance, especially a fruit press. The appliance comprises a housing having a cylindrical outer wall with at least two recesses formed therein. The recesses have openings. A drive unit has projections matching a shape of the openings and projects through the openings.

According to the invention it is possible to insert the drive unit into the housing in the axial direction. During the insertion, the projections are moved outside areas of the inside of the outer wall of the housing aligned with the openings in the axial direction. The projections are then twisted into the openings. In this way the drive unit is inserted into the housing of the kitchen appliance in the manner of a bayonet fitting.

According to the invention, the kitchen appliance has an at least substantially cylindrical structure which does not exclude cubic, rectangular, conical or truncated-cone shaped connecting elements being attached to the cylindrical structure in continuation of the longitudinal axis of the cylindrical structure. In the same way, other connecting components can also be fixedly connected to the cylindrical structure on the outside of the outer wall of the cylindrical structure.

However, as a result of its simple and compact shape, the cylindrical structure itself has the advantage that it accommodates both a drive unit with an electric motor and a gear unit as well as the part used to squeeze a fruit including the element, the collecting container and the collecting dish.

On the basis of the invention a cylindrical interior space is used in a space-saving manner because the drive unit is disposed therein making maximum usage of the available space. The drive unit is assembled or dismantled in a simple manner and quickly in the interior space. No complicated screwing of the drive unit to the outer housing is required.

In accordance with another feature of the invention, the projections of the drive unit are formed of resilient elements which are slightly oversized as compared with the height of the openings and can be pressed into the openings. A mounting which reduces vibrations and noise is achieved by using a resilient material.

In accordance with a further feature of the invention, the openings in the area of the recesses are constructed in such a way that they occupy at least part of a cylindrical wall of the recesses and part of a wall running in the radial direction.

In accordance with an added feature of the invention, the resilient elements can be pressed onto projecting lugs of a housing of the drive unit.

In accordance with an additional feature of the invention, the outer wall has a strip on its inner side running in the axial direction, along which the drive unit can be inserted into the housing of the kitchen appliance. The drive unit has a diameter smaller than the inner diameter of the housing of the kitchen appliance minus the height of the strip.

In accordance with yet another feature of the invention, in order to facilitate the insertion in the openings, the openings preferably have lead-in bevels in the area of the cylindrical wall of the recesses.

In accordance with a concomitant feature of the invention, in order to make the fixing of the projections of the drive unit inside the housing of the kitchen unit inaccessible to the outside, the cylindrical or first outer wall of the housing is enclosed by another or second outer wall which borders closely onto the first outer wall.

Other features which are considered as characteristic for the invention are set forth in the appended claims.

Although the invention is illustrated and described herein as embodied in a motorized kitchen appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
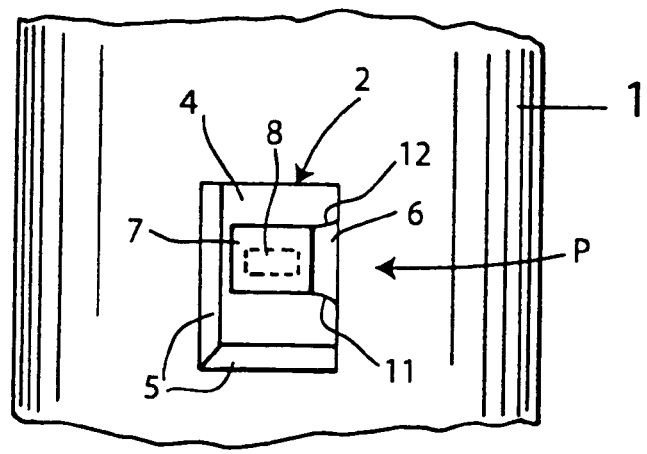
FIG. 1 is a fragmentary, diagrammatic, perspective view of a section of a cylindrical outer wall of a housing.
Figure 3:
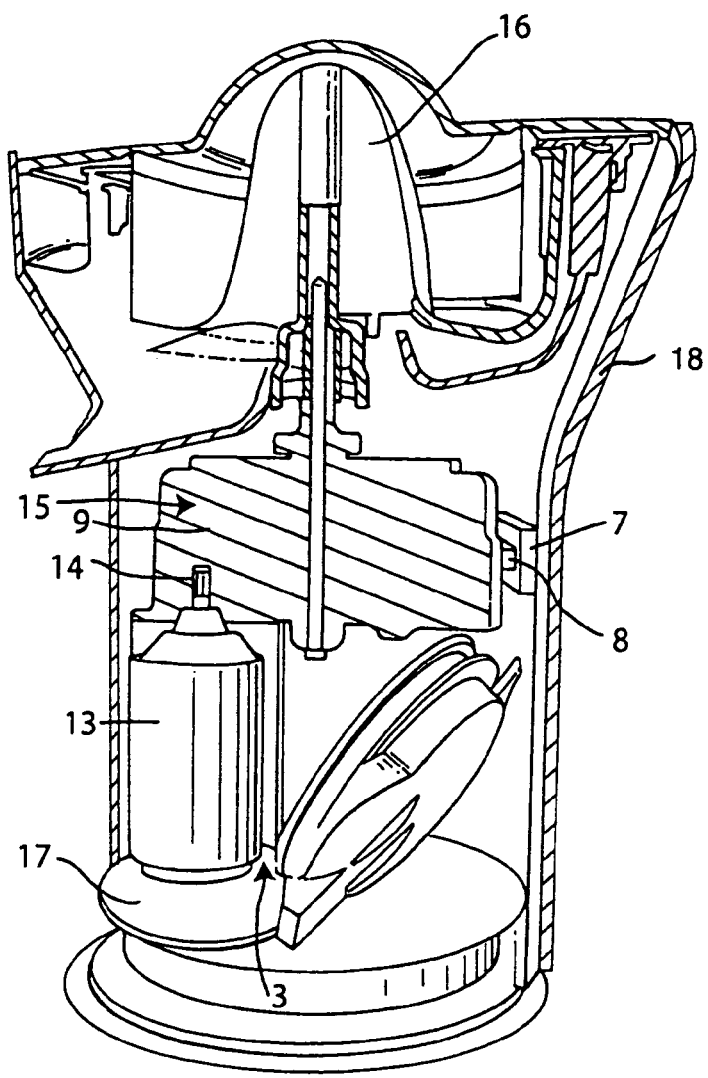
FIG. 3 is a perspective, sectional view of the housing with a drive unit.
Figure 2:
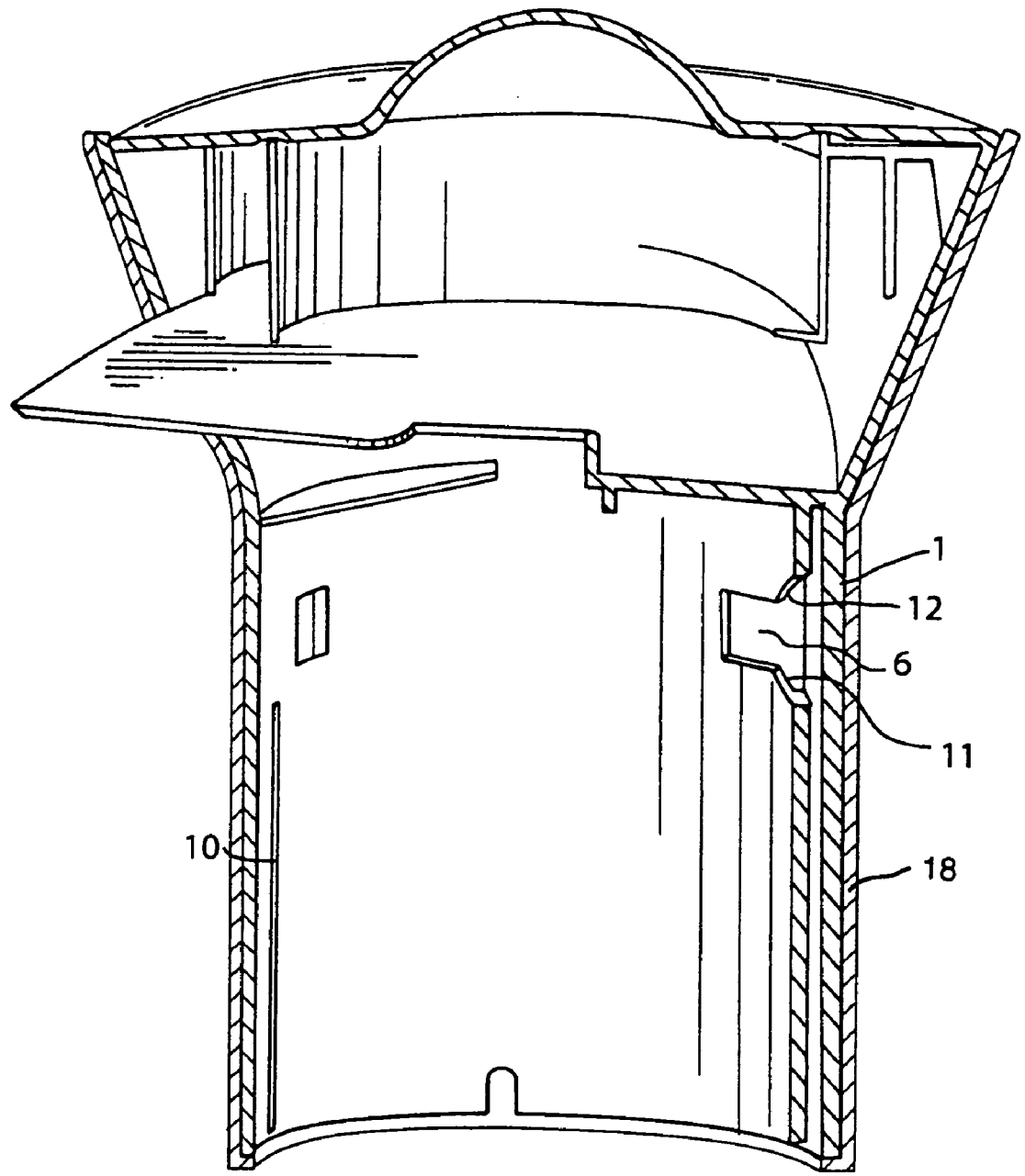
FIG. 2 is a sectional view of the housing.

DESCRIPTION OF THE PREFERRED EMBODIMENTS:

Referring now to the figures of the drawings in detail and first, particularly, to FIGS. 1 and 2 thereof, there is seen a fruit press which is fitted with a first cylindrical outer wall 1 and a second outer wall 18. The wall has at least two, but preferably three or more recesses 2 which serve to fix a drive unit 3 (shown in FIG. 3) inside the outer wall 1.

The recess 2 includes a cylindrical wall 4 which is set back relative to the outer wall 1 and is surrounded laterally, above and below, by a radically extending wall 5 for connection to the outer wall 1. Like the wall 4, the wall 5 is also penetrated in one section by an opening 6 which thus has a part extending in radial direction and a part extending in the direction of the wall 4. A projection 7 of the drive unit 3 is pushed into the opening 6. The projection 7 is formed of a resilient element, e.g. of rubber or an elastic plastic which in turn has a lug 8 that is part of an outer wall 9 of the drive unit 3.

The projection 7 is inserted into the opening 6 in a direction of rotation (indicated by an arrow P) and projects through the opening 6. The resilient material is slightly oversized as compared with the size of the opening in the axial direction of the outer wall 1 so that if the two or three projections 7 are pushed into the openings 6 assigned to them, a secure fit of the drive unit 3 in the housing, i.e., the outer wall 1, is ensured.

In order to ensure that the angular position of the drive unit 3 is fixed with respect to the outer wall 1, a strip 10 extending in the longitudinal direction, i.e., in the axial direction, is provided on the inside of the outer wall 1, as is shown in FIG. 2. This corresponds, for example, to a corresponding return, offset or wing in the outer wall which, however, is still sufficiently broad in the circumferential direction to allow a rotational movement in the direction of the arrow P.

In order to facilitate the insertion of the projections 7 in the openings 6, they preferably have lead-in bevels or inclines 11, 12.

In order to make the projections 7 inaccessible from outside, a second, non-illustrated, outer wall surrounding the outer wall 1 is inverted over the outer wall 1.

A resilient or elastic fixation of a drive unit 3 inside a housing of a kitchen appliance surrounded by an outer wall 1 is provided by the invention. The drive unit 3 is resiliently mounted through the use of projections 7 in the housing. The drive unit 3 is inserted therein in the manner of a bayonet fitting. The drive unit 3 includes an electric motor 13, a reduction gear 15 driven by the motor through a drive shaft 14, which in turn drives a rotating element 16 for pressing a citrus fruit, and a printed circuit board 17 with an electric circuit to control the electric motor 13.

We claim:

1. A motorized kitchen appliance, comprising:
   a housing having a cylindrical outer wall, the cylindrical wall having an inner surface and a pair of axial ends;
   a first recessed element;
   a second recessed element, the first recessed element and the second recessed element each being located radially inwardly of the inner surface of the cylindrical outer wall and being angularly spaced from one another, the first and second recessed elements each having an opening and the first and second recessed elements each having a radially innermost surface and the radially innermost surfaces of the first and second recessed elements delimiting an effective inner diameter; and
   a drive unit having a motor, the drive unit being disposed within the housing and having a first projection corresponding to the opening of the first recessed element for receipt therein in an installed disposition of the drive unit in the housing and a second projection corresponding to the second opening of the second recessed element for receipt therein in the installed disposition of the drive unit in the housing, the first projection and the second projection of the drive unit being located axially intermediate the pair of axial ends of the cylindrical outer wall of the housing, the first projection and the second projection of the drive unit delimiting an effective diameter of the drive unit that is greater than the effective inner diameter delimited by the radially innermost surfaces of the first and second recessed elements, the first and second projections of the drive unit each projecting outwardly from the drive unit to extend through the respective openings in the first and second recessed elements in a direction perpendicular to the vertical axis of said drive unit and the first and second projections of the drive unit engaging the openings of the first and second recessed elements to securely mount the drive unit within the housing.

2. The kitchen appliance according to claim 1, wherein said openings have a given height, and said projections are formed of resilient elements being slightly oversized as compared to said given height for being pressed into said openings with an interference fit.

3. The kitchen appliance according to claim 2, wherein said openings have lead-in bevels in vicinity of said cylindrical wall of said recesses, for aiding said projections entering said openings.

4. The kitchen appliance according to claim 1, wherein said drive unit has projecting lugs, and said projections include resilient elements pressed onto said projecting lugs.

5. The kitchen appliance according to claim 1, wherein said housing has an inner diameter, said cylindrical outer wall of said housing has an inner side with a strip having a height and running in axial direction at said inner side, for insertion of said drive unit into said housing along said strip, and said drive unit has a diameter smaller than said inner diameter of said housing minus said height of said strip.

6. The kitchen appliance according to claim 1, further comprising a rotating element driven by said drive unit for pressing fruit.

7. The kitchen appliance according to claim 1, wherein said drive unit comprises an electric motor mounted along a central vertical axis of the appliance, having a drive shaft connected to a reduction gear for being driven by the drive shaft, and said reduction gear having said projections as part thereof and extending perpendicularly from the central vertical axis of the appliance.

8. The kitchen appliance according to claim 1, wherein one of the axial ends of the cylindrical outer wall has a diameter greater than the effective diameter of the drive unit.

* * * * *